(12) United States Patent
Nahm

(10) Patent No.: US 8,969,243 B2
(45) Date of Patent: Mar. 3, 2015

(54) HYBRID TOPCOAT FORMULATIONS FOR PAPER PRODUCTS

(75) Inventor: Steven Nahm, Morristown, TN (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/431,176

(22) Filed: Mar. 27, 2012

(65) Prior Publication Data

US 2013/0260992 A1    Oct. 3, 2013

(51) Int. Cl.
*B41M 5/44* (2006.01)
*B41M 5/30* (2006.01)
*G09F 3/02* (2006.01)

(52) U.S. Cl.
CPC .......... *B41M 5/44* (2013.01); *G09F 2003/0211* (2013.01); *B41M 5/30* (2013.01); *B41M 2205/40* (2013.01)
USPC ......................................... 503/226; 503/200

(58) Field of Classification Search
CPC ...... B41M 5/30; B41M 5/40; B41M 2205/40; G09F 2003/0211
USPC ................................... 503/200–226
See application file for complete search history.

(56) References Cited

U.S. PATENT DOCUMENTS

| | | | |
|---|---|---|---|
| 6,071,853 A * | 6/2000 | Kirk et al. | 503/221 |
| 6,660,689 B2 * | 12/2003 | Serizawa et al. | 503/226 |
| 7,985,711 B2 * | 7/2011 | Tohmatsu et al. | 503/201 |
| 8,183,175 B2 * | 5/2012 | Masuda | 503/226 |

\* cited by examiner

*Primary Examiner* — Bruce H Hess
(74) *Attorney, Agent, or Firm* — Richard Traverso—Millen, White, Zelano & Branigan, P.C.

(57) ABSTRACT

Hybrid topcoat formulations comprising a water soluble polymer and a water dispersible polymer provide improved adhesion to underlying surfaces. Paper products coated with these formulations, such as thermal paper, achieve high stain resistance and improved adhesion of UV cured silicone release layers.

5 Claims, 4 Drawing Sheets

HYBRID TOPCOAT FORMULATIONS FOR PAPER PRODUCTS

FIELD OF THE INVENTION

The present invention relates to hybrid topcoat formulations for paper products and coated paper products prepared with these hybrid topcoat formulations. The hybrid topcoat formulations provide reinforcement to the underlying surface to improve the adhesion of the resulting topcoat to this surface. The hybrid topcoat formulations comprise at least one water-dispersible polymer and one water-soluble polymer. The hybrid topcoats are well suited for use on the functional layer of thermal papers used in direct thermal printing, including those with integrated labels that employ silicone release layers.

BACKGROUND OF THE INVENTION

It is well known in the art to use topcoats on print paper to protect underlying layers from environmental conditions. In the case of thermal paper, the topcoat serves to protect the underlying functional layer/thermal coating from premature coloration when handling and environmental contaminants. Examples of known topcoats are disclosed in U.S. Pat. Nos. 4,370,370; 4,388,362; 4,424,245; 4,444,819; 4,507,669; 4,551,738 and 4,604,635.

A barrier layer for thermochromic coloring layers comprised of water soluble polymers is described in U.S. Pat. No. 4,370,370. Examples of water-soluble polymers disclosed therein are polyvinyl alcohol, carboxymethyl cellulose, methyl cellulose, ethyl cellulose, hydroxymethyl cellulose. hydroxyethyl cellulose, hydroxypropyl cellulose, polyvinylacrylamide, starch, gelatin casein, and polyvinylpyrolidone. Blends of carboxyl-group modified polyvinyl alcohols in an appropriate solvent with polyamide resin, melamine resin, formalin, glyoxal, or chromium alum are said to provide a barrier layer with high water resistance.

A water-soluble resin solution (polyvinyl alcohol) is used to provide a protective top coating for thermochromic layers in U.S. Pat. No. 4,388,362.

A water-soluble resin mixed with a wax or wax like material is used to form a protective topcoat for thermochromic layers in U.S. Pat. No. 4,424,245. The wax is said to provide improved water resistance. Examples of water-soluble polymers disclosed therein are polyvinyl alcohol, hydroxyethyl cellulose, methyl cellulose, carboxymethyl cellulose, starch and derivatives thereof, casein, sodium alginate, polyvinylpyrolidone, polyacrylamide, and a copolymer of styrene and maleic acid.

Polyvinyl alcohol with a 70-85% saponification ratio is used to form a protective top coat for thermochromic coloring layers in U.S. Pat. Nos. 4,444,819 and 4,551,738. Thermosetting organic fillers, organic antifriction materials and water resistant agents are said to be suitable auxiliary components that can be added to the polyvinyl alcohol. Examples of thermosetting organic fillers are said to be urea-formaldehyde resin, phenolic resin, polycarbonate resin and melamine resin. The organic antifriction agents are waxes that can be used in the form of a fine powder or an emulsion from 20-60 wt. % percent of the protective layer.

Polyvinyl alcohol, cellulose ether, starch, ammonium polycarboxylates and alkaline salts of isobutylene maleic anhydride polymer are described as water soluble resins suitable for forming a protective layer for thermochromic coloring layers in U.S. Pat. No. 4,507,669.

U.S. Pat. No. 4,604,635 discloses a protective coating for thermochromic coloring layers comprised of a cured silicone resin.

These conventional topcoat formulations, excluding the components classified as fillers, generally comprise water-soluble polymers and are not optimized with regard to adhesion to the underlying surface.

There is a continuing need/desire to improve the anchorage of coatings in print media, including topcoats. When improving the anchorage of coatings to the underlying surface on print media, the print quality will generally improve through an improvement in abrasion resistance. A coating's abrasion resistance primarily depends on its mechanical properties but is also related to how well it is anchored to the underlying surface in the case of direct thermal paper, the improved adhesion will improve the abrasion resistance of the topcoat and thereby reduce the abrasion-generated buildup of the topcoat on the thermal print head. By limiting the buildup on the thermal print head, print quality is improved.

SUMMARY OF THE INVENTION

The present invention provides hybrid coating formulations which form topcoats with improved adhesion to the underlying surface through the use of a binder mixture comprising a water-soluble polymer and a water-dispersible polymer (latex polymer). By forming topcoats with improved adhesion to the underlying surface of print media, the hybrid topcoat formulations of this invention are well suited for use on print media with porous surfaces, including direct thermal papers. The hybrid topcoats of this invention can be applied to the thermochromic coatings (the front) of thermal paper and optionally the back of the thermal paper to protect the surfaces and prevent discoloration during handling and degradation of the print. The hybrid topcoats exhibit superior adhesion to the thermochromic coatings and provide improved print quality. The use of the hybrid topcoats on thermal paper will reduce dust formation when the thermal paper is cut or torn from supply rolls, as in the case of ATM's (Automated Teller Machines) and POS (point-of-sale) terminals.

The hybrid topcoat formulations of this invention are well suited for use on thermal paper used in direct thermal printing but are not limited to such substrates. The hybrid topcoat formulations of this invention can be used on any print medium that finds use in thermal printers, thermal transfer printers, ink jet printers, laser printers, typographic printers, letterpress printers, offset printers, pianographic printers, lithographic printers, intaglio printers or gravure printers. The hybrid topcoat formulations of this invention can also be used on wood, paper, textile, leather, cement moldings, fiber-cement slabs. The hybrid coating formulation is well suited for use on porous substrates where the water soluble component can migrate into the substrate to reinforce it. Through the use of the hybrid topcoat formulations of this invention, the present invention also provides substrates such as thermal papers and other print media, having a hybrid topcoat.

The term "topcoat", as used herein, refers to a coating which provides a decorative or protective outermost finish layer on a substrate.

The term "water-soluble polymer", as used herein, refers to a polymer that dissolves in water such that scattering is not observed when a dilute solution (about 1 g/L) of the polymer is analyzed using dynamic light scattering or any other technique well known in the art of particle analysis.

The term "water-dispersible polymer," as used herein, refers to a polymer that exists in the form of particles in water, the particles being dispersed or suspended and often stabilized against flocculation and settling by the use of dispersing agents. In contrast to a water-soluble polymer, a dilute solution (about 1 g/L) of a water-dispersible polymer exhibits scattering when analyzed using dynamic light scattering or any other technique well known in the art of particle analysis.

The term "latex polymer", as used herein, refers to a dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed. An emulsion contains polymer particles which are generally smaller than the polymer particles within a dispersion.

"Thermal paper", as defined herein, is a thermosensitive recording material on which print or a design is obtained without an ink ribbon by the application of heat energy to its surface.

A "thermochromic coating", as defined herein, comprises color forming chemicals and additives such that when heat is applied by a thermal print head, the color forming chemicals melt and react/interact to develop the desired print or image.

A "base substrate", as defined herein, comprises a) a sheet of natural or synthetic fibers or both, which are either filled or unfilled with pigments such as titanium dioxide, or b) a film of synthetic resin.

The term "minimum film forming temperature" also referred to herein as MFFT, is the temperature at which a polymer forms a continuous film with some or all of the resin in a continuous phase as determined by the basic principles and procedures set forth in ASTM D2354.

The term "stain resistance", as meant herein, refers to the resistance of a print medium to water-based stains using the Shirlastain test.

The term "comprises" and variations thereof does not have a limiting meaning where such term appears in the description or claims. Thus, a composition comprising an ethylenically unsaturated compound means that the composition includes one or more of the ethylenically unsaturated compounds and optionally other components.

The terms 'preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "(meth)" followed by another term such as acrylate or acrylamide, as used throughout the disclosure, refers to both acrylates or acrylamides and methacrylates and methacrylamides, respectively.

The hybrid topcoat formulation of this invention employs a binder which comprises a mixture of a water-soluble polymer and a water-dispersible polymer (latex polymer) in an aqueous solvent which has a MFFT of about −5° C. to about 35° C.

Examples of water-soluble polymers suitable for use as a binder component include polyvinyl alcohol polymers ("PVA"), polyacrylate polymers, polyvinyl ester resins, partially hydrolyzed polyvinyl ester resins, fully hydrolyzed polyvinyl ester resins, polysaccharides such as methyl cellulose, ethyl cellulose, hydroxymethyl cellulose, hydroxyethyl cellulose, hydroxypropyl cellulose, cellulose ether, starch and derivatives thereof, polyvinylacrylamide, gelatin, casein, sodium alginate, polyvinylpyrolidone, polyacrylamide, polyethers such as polyethylene glycol polypropylene glycol, random and block copolymers of ethylene oxide and propylene oxide, ethylene-vinyl or a combination thereof.

Preferred water-soluble polymers include polyvinyl alcohol polymers, polyethylene glycol polymers and polysaccharides such as methyl cellulose, ethyl cellulose, hydroxymethyl cellulose, hydroxyethyl cellulose, hydroxypropyl cellulose, cellulose ether, starch and derivatives thereof.

Examples of water-dispersible polymers suitable for use as a binder component in the hybrid topcoat formulations of the present invention include those which have a MFFT of about −5° C. to about 35° C., and are selected from polyesters, polyester containing polymers, polyamides, chlorinated polymers, polyolefins, polyurethanes, polyethers, polyacrylonitriles, polyvinylacetates, polyacrylamides, polyketones, polycarbonates, acrylics(polyalkylmethacrylates), styrenated poly(meth)acrylates, copolymers of styrene and for example butadiene or isoprene and their hydrogenated analogues, vinylics (vinyl polymers and copolymers, polyvinyl acetate) and fluoropolymers.

Examples of suitable polyesters include; polyethylene terephthalate; poly(1,4-butylene)terephthalate; and 1,4-cyclohexylene dimethylene terephthalate/isophthalate copolymer and other linear homopolymer esters derived from aromatic dicarboxylic acids, including isophthalic acid and bibenzoic acid, and diols including from the group consisting of 2,2-dimethyl-1,3-propanediol; cyclohexane dimethanol and aliphatic glycols of the general formula $HO(CH_2)_nOH$ were n is an integer from 2 to 10, e.g., ethylene glycol; 1,4-tetramethylene glycol; 1,6-hexamethylene glycol; 1,8-octamethylene glycol; 1,10-decamethylene glycol; and 1,3-propylene glycol; and polyethylene glycols of the general formula $HO(CH_2)_nOH$ where n is an integer from 2 to 100, and aromatic diols such as hydroquinone, resorcinol and the isomers of naphthalene dial (1,5-; 2,6-; and 2,7-). There can also be present one or more aliphatic dicarboxylic acids, such as adipic, sebacic, azelaic, dodecanedioic acid or 1,4-cyclohexanedicarboxylic acid. Also included are polyester containing polymers such as polyesteramides, polyesterimides, polyesteranhydrides, polyesterethers and polyesterketones.

Preferred chlorinated polymers are polyvinylidene chloride (PVDC) homopolymers and copolymers and blends thereof. Particularly preferred copolymers include those with polyvinyl chloride (PVC) and chlorinated PVC (CPVC).

Suitable water-dispersible polyolefin polymers include material made by polymerizing or copolymerizing olefins such as ethylene, propylene, butene-1, pentene-1,4-methylpent-1-ene in a conventional manner. Examples include of useful polyolefins include high-density polyethylene (HDPE), polypropylene, low-density polyethylene (LDPE), very low-density polyethylene (VLDPE), linear low-density polyethylene (LLDPE) and polybutylene (PB). Examples of suitable copolymers include ethylene/acrylic acid (EAA) copolymers and ethylene/vinyl acetate copolymers (VAE).

Suitable polyamide resins include semi-crystalline and amorphous resins, which may be produced for example by condensation polymerization of equimolar amounts of saturated dicarboxylic acids with diamines, by ring opening polymerization of lactams, or by copolymerization of polyamides with other components, e.g. to form polyether polyamide block copolymers.

Suitable water-dispersible polyether polymers include poly(alkylene oxides), such as poly(propylene oxide) and aromatic polyethers such as poly(2,6-dimethyl-1,4-phenylene oxide) and phenyl ether copolymers formed from 2,6-dimethylphenol and 2,3,6-trimethylphenol.

Suitable polycarbonates are those prepared from bisphenol A and derivatives thereof.

Suitable fluoropolymers include polytetrafluoroethylene (PTFE), fluorinated ethylene-propylene (FEP), polyvinylidene fluoride (PVDF), poly ethylene-tetrafluoroethylene (F-TFE), poly ethylene-chlorotrifluoroethylene (E-CTFE), polyvinyl fluoride (PVF), poly chlorotrifluorocthylene-vinylidene fluoride (CTFE-VDF), polychlorotrifluoroethylene (PCTFE), tetrafluoroethylene/hexafluoropropylene/-vinylidene fluoride (THY) and amorphous fluoropolymers, as well as polymers containing fluorinated monomers, such as derived from C4 and higher perfluorinated carboxylic, sulfonic or phosphoric acids and diacids.

The water-dispersible polymer (latex polymer) suitable for use in this invention is preferably prepared through chain-growth polymerization, using one or more ethylenically unsaturated monomers. Non-limiting examples of ethylenically unsaturated monomers include monomers such as acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, hydroxypropyl acrylate, hydroxypropyl methacrylate, glycidyl acrylate, glycidyl methacrylate, 4-hydroxybutyl acrylate glycidylether, 4-hydroxybutyl methacrylate glycidylether, acrylamide, methylacrylamide, diacetone acrylamide, methylol(meth)acrylamide, acrylonitrile, styrene, a-methyl styrene, vinyl toluene, vinyl acetate, vinyl propionate, alkyl methacrylate, maleic anhydride or acid, fumaric acid, or mixtures thereof.

The water-dispersible polymers that can be used as a binder component in the hybrid topcoat formulations of the present invention are typically formed by an emulsion polymerization process. The polymerization techniques used to prepare aqueous emulsion polymers are well known in the art. In the emulsion polymerization of the aqueous dispersion of polymers used in this invention, conventional surfactants can be used to stabilize the latex polymers such as, for example, anionic and/or nonionic emulsifiers (surfactants) such as, for example, ammonium salts of alkyl, aryl, or alkylaryl sulfates, sulfonates or phosphates; sulfosuccinate salts; fatty acids; ethylenically unsaturated surfactant monomers; and ethoxylated alcohols or phenols. Specific examples of suitable nonionic emulsifiers include tertoctylphenoxyethylpoly(39)-ethoxyethanol, dodecyloxypoly(10)ethoxyethanol, nonylpherioxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl) phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with ethylene oxide, N-polyoxyethylene(20)lauramide, N-lauryl-N-polyoxyethylene(3)amine and poly(10)ethylene glycol dodecyl thioether. The amount of surfactant used is usually 0.1% to 6% by weight, based on the weight of monomer.

The water-dispersible polymer may be formed using suitable free radical initiators (oxidants) typically used for chain growth polymerization such as, for example, hydrogen peroxide; sodium or potassium peroxide; t-butyl hydroperoxide; t-alkyl hydroperoxide, t-alkyl peroxide(t-butyl peroxide), or t-alkyl perester wherein the t-alkyl group includes at least 5 1[sn2]carbon atoms; cumene hydroperoxide; ammonium and/or alkali metal persulfates (sodium, potassium and lithium persulfate); sodium perborate; perphosphoric acid and salts thereof potassium permanganate; and ammonium or alkali metal salts of peroxydisulfuric acid; typically at a level of 0.01% to 3.0% by weight, based on the weight of monomer. The free radical initiator can be used with a reducing agent. Representative reducing agents include sulfites such as alkali metal metabisulfite, hydrosulfite, and hyposulfite; sodium formaldehyde sulfoxylate; and reducing sugars such as ascorbic acid and isoascorbic acid. in a redox system the amount of reducing agent is preferably from 0.01 to 3 weight %, based on the total amount of monomer. The polymerization reaction can be performed at a temperature in the range of from about 10° C. to about 100° C.

The polymers which form the binder of the hybrid topcoat formulations should have a MFFT of about −5° C. to about 35° C., and preferably an MFFT of about 0° C. to about 30° C., and more preferably from about 0° C. to 20° C.

Unexpectedly, the topcoat formulations of the present invention have been found to provide better stain resistance than topcoats formed from coating formulations that only employ the same water-dispersible polymer or water-soluble polymer separately as binders.

The water soluble polymer and water dispersible polymer are preferably combined within aqueous solutions having a similar pH to avoid the formation of separate phases. The ratio of the water soluble polymer to water dispersible polymer can vary widely depending on the polymers selected. Weight (solids) ratios of 1:15 to 15:1 of water soluble polymer to water dispersible polymer are preferred. This ratio can be varied to manipulate the properties of the hybrid topcoat formulation. Optimum compositions are best represented by the ratio of the two types of polymers combined, the value of which depends on the identity of the polymers that are combined.

Weight ratios within this range which favor the water-dispersible polymer, such as 1:10, 1:5 and 1:2 of water-soluble polymer to water-dispersible polymer, are expected to be more common when providing a protective coating. For example, a weight (solids) ratio of 1:3-5 water-soluble polymer (polyvinyl alcohol) to water dispersible polymer (styrene acrylic copolymer) was found to maximize stain resistance, assessed by the subjective Shirastain test, of a print medium under a cured silicone release coating.

The hybrid topcoat formulations may be applied to the print media by any conventional coating method such as flood coating and metering, curtain coating, roll coating, brush coating, bar coating, air-knife coating, flow coating, spray coating (air-atomized spray, airless spray, air assisted spray, HVLP spray, and electronic spray), dip coating and conventional printing methods such as the typographic, letterpress or relief method; the planographic or lithographic method; or the intaglio or gravure method.

The hybrid topcoat formulation is dried following application to a substrate to remove water and coalesce the film to form a coating. Optionally, the hybrid topcoat formulation can be dried by heating the coated substrate (web) with hot air, infrared radiation or microwave radiation. The coated substrate (web) can also be air dried at ambient temperature, The specific temperature used will depend upon the composition of the hybrid topcoat formulation used. In a preferred embodiment, the topcoat dries to 100% solids, or close to being 100% solids at a temperature at or above the dispersed polymer MFFT to form a continuous, defect-free film.

The hybrid topcoat formed with the topcoat formulation of the present invention preferably has a thickness of from 0.5 to 20.0 microns, more preferably from 0.7 to 10 microns, most preferably 1.0-2.5 microns. The coating weight is not limited to any particular value but the range from about 0.5 to 20 g/m$^2$ is typical, more typically 1.0 to 2.5 g/m$^2$, on a dry basis.

To obtain hybrid topcoats with the hybrid topcoat formulation of the present invention, the rheology of the hybrid topcoat formulation is controlled to fall within the range of 50 cps to 10,000 cps, preferably between 100 cps to 8,000 cps. The viscosity desired will depend on the coating method and the desired coating weight.

The following components can be added to the hybrid topcoat formulation to aid in controlling the rheology of the topcoat formulation so as to form thin coatings: water, water soluble solvent, a pH control agent (buffer), a leveling agent, a wetting agent and/or a defoaming agent.

Conventional wetting agents are preferably used to achieve the desired wetting characteristics to properly coat the print medium. Suitable wetting agents are, for example, amphoteric surfactants such as alkyl polyamino carboxylates and cationic surfactants such as primary amines, secondary amines, tertiary amines, diamines, polyamines, amine salts, amidoamines, quaternary ammonium compounds, esterquats; and non-ionic surfactants such as alkanolamides, alcohol alkoxylates, alkyl glucosides, alkyl phenol alkoxylates, alkanolamide alkoxylates, amine oxides, castor oil ethoxylates, ethoxylated oils and acids, ethylene/propylene glycols, imidazolines, PEG esters, phenol ethoxylates and sorbitan ester. It is preferred that wetting agents containing acid salts use ammonium counter ions to the acids.

The hybrid topcoat formulation may contain additional components designed to upgrade the performance of hybrid topcoat for its intended purpose. Additive components conventionally known to enhance the performance of coatings obtained from water-soluble resins are suitable. These additives can vary widely and are well known to those of skill in the art. They include static or abrasion reducing additives, fillers, plasticizers, dyes, emulsifiers, coalescing agents, buffers, neutralizers, thickeners, rheology modifiers, humectants, wetting agents, biocides, plasticizers, antifoaming agents, colorants, waxes, and antioxidants, tackifiers, pigments, surfactants, ultraviolet light absorbing agents, lubricants, and/or agents preventing the thermosensitive recording composition from coloring upon application of pressure. Suitable fillers for use in the topcoat can comprise, for example, inorganic fillers and/or organic fillers. Exemplary inorganic fillers include calcium carbonate, silica, zinc oxide, titanium oxide, aluminum oxide, aluminum trihydrate, zinc hydroxide, barium sulfate, clay, calcined clay, kaolin talc, calcium carbonate and silica, which are subjected to surface treatment, and the like. Platelet fillers with high aspect ratios, such as platelet clays and talc, enhance the barrier properties of the coating formed, reducing or preventing the interaction of components between different layers. Exemplary organic fillers include particulate urea-formaldehyde resins, particulate styrene-methacrylic acid copolymers, particulate polystyrene resins, and the like. Fillers can be used alone or in combination.

To increase the longevity of a thermal print head and/or to reduce sticking, a heat fusing material can be included in the hybrid topcoat formulation. In some embodiments, the heat fusing material includes animal waxes such as bees wax or shellac wax; vegetable waxes such as carnauba wax; mineral waxes such as montan wax; petroleum waxes such as microcrystalline wax; higher fatty acid amide such as higher fatty acid polyhydric alcohol ester or stearic acid amide; higher fatty acid metal salt such as zinc stearate or calcium stearate; synthetic wax such as higher amine; condensation product of fatty acid and amine; condensation product of aromatic and amine; synthetic paraffin; chlorinated paraffin; oxidized paraffin; higher straight chain glycol; 3,4-epoxyhexahydro phthalic acid dialkyl; polyethylene and polyethylene oxide, and the like. These additives may be introduced to the hybrid topcoat formulation in the form of aqueous concentrates or they may be introduced dry, without an aqueous carrier.

The hybrid topcoat can be transparent, translucent, or opaque, depending on the amount of pigment and fillers, if any, that are present in the hybrid topcoat formulation.

The hybrid topcoat formulation is typically applied to the entire surface of a print medium to form a continuous layer, such as in the case of coating thermal paper. The hybrid topcoat formulations are well suited for use on thermal papers. The hybrid topcoat need not be a continuous layer on the surface of the print medium. It may be applied at selective locations on the print medium.

Not being bound by theory, it is believed that the particulate nature of the water-dispersible polymer prevents it from substantial penetration into the direct thermal coating and it resides primarily on the exterior surface of the substrate. With the water-soluble polymer being present in the homogeneous aqueous solution, it diffuses through the surface of the direct thermal coating, carried by the water as it soaks into the substrate where it acts as an additional binder, reinforcing and strengthening the structure. Some of the water-soluble phase remains within the film formed by the water-dispersible polymer, possibly as a gradient, with the lowest concentration being present at the air-topcoat interface and the highest concentration being present at the thermal layer-topcoat interface.

Thermal paper typically comprises a base substrate, an optional base coating positioned on said base substrate and a thermochromic coating positioned on the base substrate or base coating. The optional base coating applied to the base substrate is typically comprised of inert clays and serves to provide a smooth level surface for the thermochromic coating.

The most common type of thermochromic coating is the dye-developing type system which comprises color producing components and a binder. The three main color producing components in a dye developing-type thermal paper are a colorless dye/leuco dye (color former), a bisphenol compound or an acidic material (color developer) and a sensitizer. Suitable lueco dyes include triphenylmethane-type leuco compounds, fluoran-type leuco compounds, phenothiazine-type leuco compounds, auramine-type leuco compounds and spiropyran-type leuco compounds. Suitable sensitizers include higher fatty acid amides and derivatives thereof; higher fatty acid metallic salts; animal waxes; vegetable waxes and petroleum waxes.

The base substrate of the print media suitable for use in the present invention can comprise a wide variety of natural fiber materials and synthetic resin fiber materials. For example, the synthetic resin fiber material may comprise polymers and copolymers such as polyolefins, polyacrylates, polystyrene, polyamides, polyvinyl alcohols, poly(alkylene acrylates), poly(ethylene vinyl alcohols), poly(alkylene vinyl acetates), polyurethanes, polyacrylonitriles, polyesters, polyester copolymers, fluoropolymers, polysulfones, polycarbonates, styrene-maleic anhydride copolymers, styrene-acrylonitrile copolymers, ionomers based on sodium or zinc salts of ethylene methacrylic acids, polyacrylonitriles, alkylene-vinyl acetate copolymers, or mixtures of two or more thereof.

Base substrates comprised of synthetic resin fibers may be free of inorganic fillers and/or pigments for clear labels or they may contain inorganic fillers and other organic or inorganic additives to provide desired properties such as appearance properties (opaque or colored films), durability and processing characteristics. Examples of useful materials include calcium carbonate, titanium dioxide, metal particles, fibers, flame retardants, antioxidant compounds, heat stabilizers, light stabilizers, ultraviolet light stabilizers, antiblocking agents and/or processing aids.

The base substrate can be a monolithic layer or it can be a composite of two or more layers of different or identical materials.

Certain chemicals can adversely affect and degrade the performance of the thermochromic coatings and should be minimized or avoided entirely in the hybrid topcoats such as some organic solvents (ketones, esters), plasticizers (polyethylene glycol type), acetic acid and other water soluble acids, solid acids such as fatty acids and other water dispersible acids, polyacrylic acid, and certain oils (vegetable oil, soy oil).

Additionally, where the thermal paper will include a linerless label with a UV cured silicone release layer, the hybrid topcoat formulations of the present invention have been found to provide hybrid topcoats with improved silicone anchorage (assessed by rub resistance) and blocking resistance. Where the thermal paper will include a linerless label with a UV cured silicone release layer, it is preferable to use water dispersed polymers within a latex stabilized with ammonium salt emulsifiers with fugitive cations ($NH_4^+$) as opposed to alkali metal salts which contain persistent cations ($Na^+$, $K^+$). These persistent cations generate counter ions (RCOO—) from a carboxylic acid which inhibit the cure of the UV cured cationic silicone release layer resulting in poor adhesion.

EXAMPLES

As specific examples of the topcoat formulations of the present invention dispersed phase, EC185 styrene/acrylic copolymer was combined in different ratios with water soluble Celvol 107 fully hydrolyzed low molecular weight polyvinyl alcohol and applied to a direct thermal paper. The ratios employed and observed stain resistance, assessed by the subjective Shirlastain test, are shown in the Figure. The data in the Figure indicates an optimum topcoat formulation, with regard to stain resistance, in the range of 1 part Celvol solids to 4 parts of F, C185 (based on solids).

In another unexpected result, the styrene/acrylic and ethylene/acrylic acid dispersions, as $NH_4^+$ salts, gave silicone rub resistance of >10 double rubs with no perceptible damage to the silicone. Typical results for cationic UV silicone over a commercial top coated paper (Kanzaki KL370 grades) suffered major damage to complete removal after only 4 double rubs.

Figure 1:
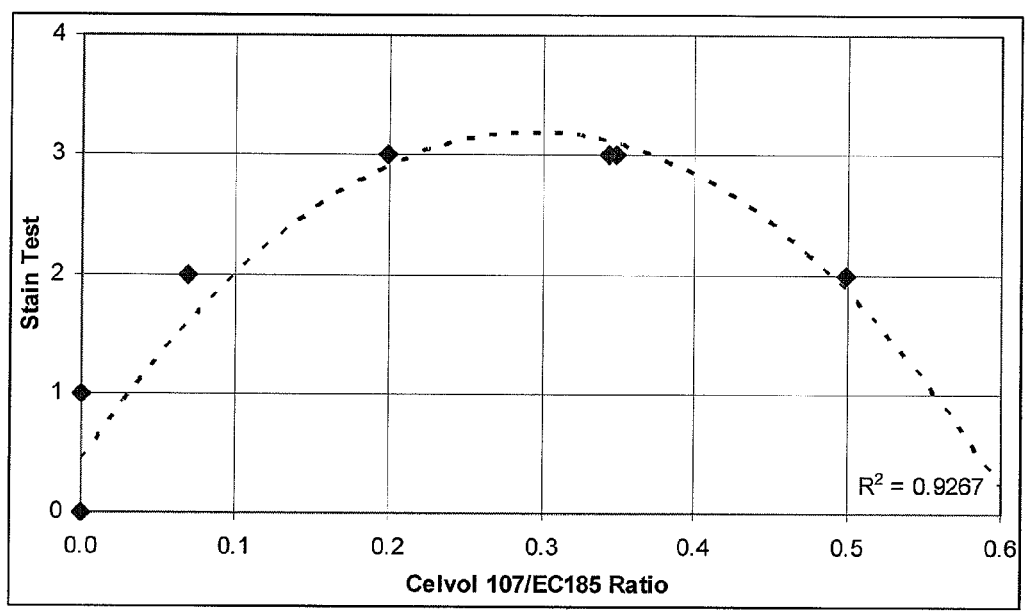
FIG. 1 is a graph illustrating the Shirlastain test (stain resistance) results for various topcoat formulations.
Figure 2A:
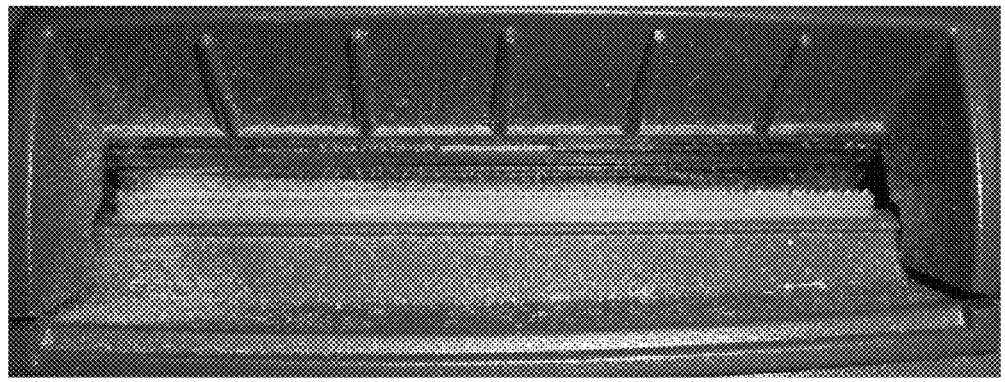
FIG. 2a is a photograph of the exterior of a point of sale thermal printer which employed a thermal paper without a hybrid topcoat of this invention (Kanzaki's top coated KL.370NCR with a standard release coating and adhesive).
Figure 2B:
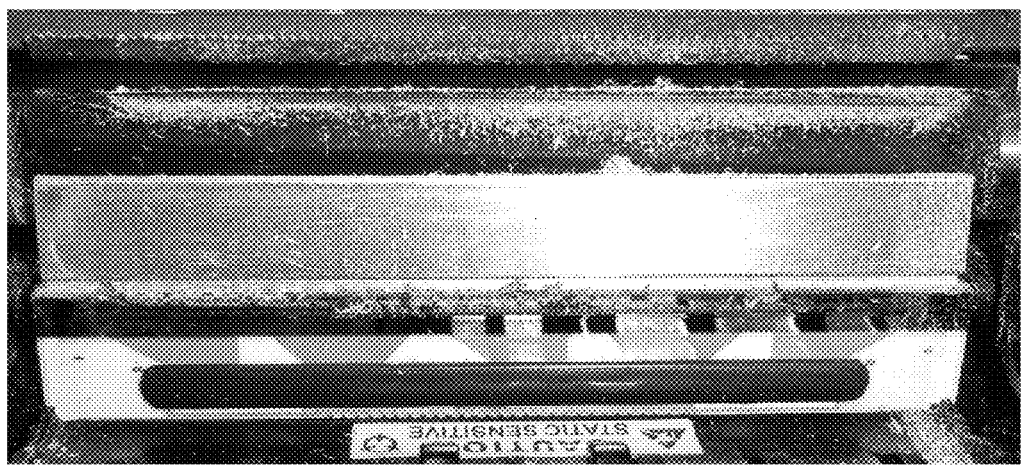
FIG. 2b is a photograph of the interior of a point of sale thermal printer which employed a thermal paper without a hybrid topcoat of this invention (Kanzaki's top coated KL.370NCR with a standard release coating and adhesive).
Figure 3A:
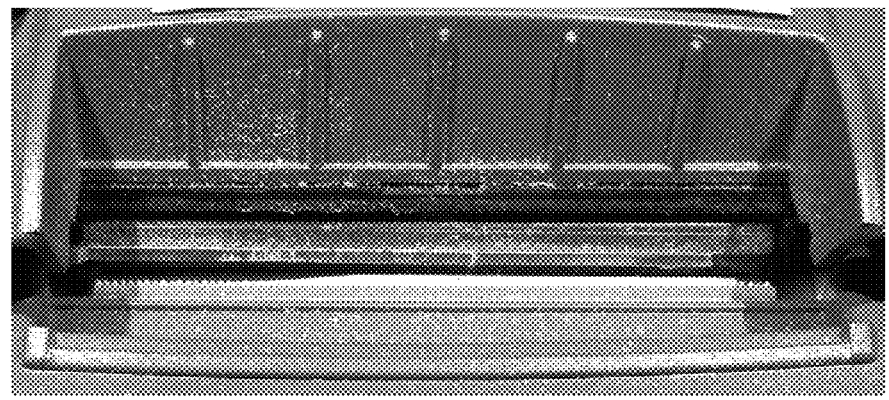
FIGS. 3a and 3b are photographs of the exterior and interior of a point of sale thermal printer, respectively, which employed a thermal paper with a hybrid topcoat of this invention (Appleton uncoated alpha 800 with a hybrid topcoat of Aquamac 737 dispersion polymer and Celvol 103 soluble polymer at a ratio of 275:1 on a solids weight basis with a standard release coating and adhesive) showing less dust than in FIGS. 2a and 2b.
Figure 3B:
Figure 4A:
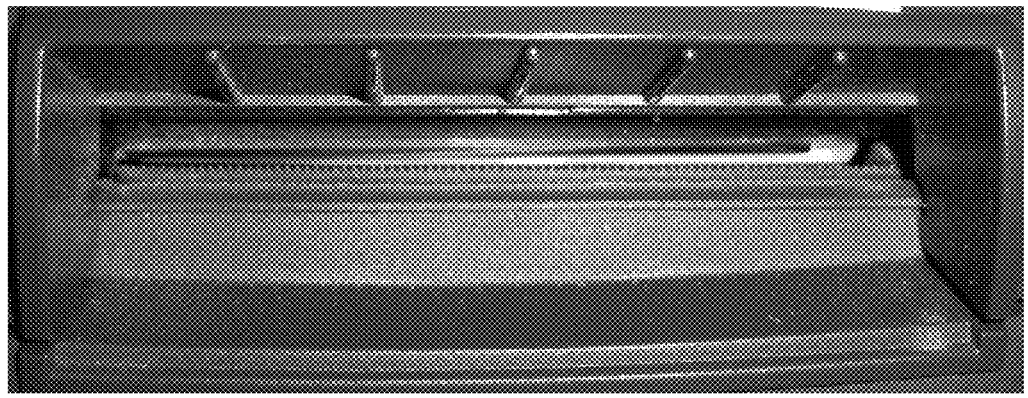
FIGS. 4a and 4b are photographs of the exterior and interior of the point of sale thermal printer shown in FIGS. 2a, 3a, 2b and 3b with the dust removed.
Figure 4B:

What is claimed is:

1. A thermal paper comprising a base substrate, an optional base coating positioned on at least one surface of said base substrate, a thermochromic coating positioned on the base coating when present or at least one surface of said base substrate, said thermochromic coating comprising a color former which is a colorless dye or lueco dye, a color developer which is a bisphenol compound or an acidic material, and a sensitizer, a topcoat having a thickness of 0.5 to 20 microns and a MFFT of about −5° C. to about 35° C. comprising a water-soluble polymer and a water-dispersible polymer in a weight (solids) ratio of water-soluble polymer to water-dispersible polymer in the range of 1:15 to 15:1, a UV cured silicone release layer positioned on said topcoat and a pressure-sensitive adhesive layer positioned on the side of the thermal paper opposite said topcoat, wherein the topcoat is substantially free of alkali metal cations, wherein said water-soluble polymer is polyvinyl alcohol polymers, polyacrylate polymers, polyvinyl ester polymers, partially hydrolyzed polyvinyl ester polymers, fully hydrolyzed polyvinyl ester polymers, methyl cellulose, ethyl cellulose, hydroxymethyl cellulose, hydroxyethyl cellulose, hydroxypropyl cellulose, cellulose ethers, starch and derivatives thereof, polyvinyl acrylamide, gelatin, casein, sodium alginate, polyvinylpyrolidone, polyacrylamide, polyethers including polyethylene glycol and random and block copolymers of ethylene oxide and propylene oxide, or a combination thereof; and wherein said water-dispersible polymer is a polyvinyl ester polymer or copolymer, (meth)acrylic polymer or copolymer, polyester or polyester copolymer, polyamide, chlorinated polymer, polyolefin or polyolefin copolymer, polyurethane, polyether, polyacrylonitrile, polyacrylamide, polyketone, polycarbonate or fluoropolymer stabilized within the topcoat formulation with an emulsifier.

2. A thermal paper of claim 1 wherein the weight ratio of water soluble polymer to water dispersible polymer is 1:3-5.

3. A thermal paper of claim 2 wherein the water-soluble polymer is polyvinyl alcohol and the water-dispersible polymer is a styrene acrylic copolymer.

4. A thermal paper as in claim 1 wherein the pressure sensitive adhesive and a UV cured silicone release layer provide one or more labels integrated in or on said thermal paper.

5. A thermal paper as in claim 4 wherein one or more of said labels are integrated in the thermal paper and are linerless.

* * * * *